(12) United States Patent
Osburn, III

(10) Patent No.: US 6,961,753 B1
(45) Date of Patent: Nov. 1, 2005

(54) ENTERPRISE SERVER FOR COMMUNICATION FOR A SUPERVISORY CONTROL AND DATA ACQUISITION (SCADA) SYSTEM

(76) Inventor: Douglas C. Osburn, III, 936 Plantation St., League City, TX (US) 77573

( * ) Notice: Subject to any disclaimer, the term of this patent is extended or adjusted under 35 U.S.C. 154(b) by 724 days.

(21) Appl. No.: 10/036,606

(22) Filed: Dec. 21, 2001

Related U.S. Application Data

(63) Continuation-in-part of application No. 09/826,578, filed on Apr. 5, 2001, now Pat. No. 6,950,851.

(51) Int. Cl.[7] .............................................. G06F 15/16
(52) U.S. Cl. ...................... 709/203; 709/223; 709/227; 709/230; 700/9; 700/28
(58) Field of Search ................................ 709/200–203, 709/223–224, 227–230; 700/9, 17, 22, 28, 700/83, 286, 295; 702/1, 60–62

(56) References Cited

U.S. PATENT DOCUMENTS

| | | | | |
|---|---|---|---|---|
| 5,583,793 A | * | 12/1996 | Gray et al. | 709/223 |
| 5,638,378 A | * | 6/1997 | Scop et al. | 710/107 |
| 5,794,009 A | * | 8/1998 | Coleman et al. | 709/227 |
| 5,812,394 A | * | 9/1998 | Lewis et al. | 700/17 |
| 6,032,154 A | * | 2/2000 | Coleman et al. | 707/104.1 |
| 6,411,987 B1 | * | 6/2002 | Steger et al. | 709/203 |
| 6,477,434 B1 | * | 11/2002 | Wewalaarachchi et al. | 700/83 |
| 6,628,992 B2 | * | 9/2003 | Osburn, III | 700/9 |
| 6,687,573 B2 | * | 2/2004 | Egolf et al. | 700/292 |
| 6,751,562 B1 | * | 6/2004 | Blackett et al. | 700/286 |
| 6,853,920 B2 | * | 2/2005 | Hsiung et al. | 702/1 |

* cited by examiner

*Primary Examiner*—Bharat Barot
(74) *Attorney, Agent, or Firm*—Buskop Law Group, P.C.; Wendy Buskop

(57) ABSTRACT

An enterprise server for communication for a supervisory control and data acquisition (SCADA) system, comprising: configurable server software running on memory in a computer; a configurable server interface adapted to receive at least one client request from at least one client application for specific device status data and providing those requests to the server software; a configurable protocol interface with the server software for building a message for the specific device using a device protocol; a configurable connection interface for connecting to the specific device and enabling the message to be transmitted to the specific device and receiving the specific device status data from the specific device and transmitting the status data to the server interface using the device protocol; and caching the status data on the memory in the computer as cached data from the configurable server interface.

34 Claims, 8 Drawing Sheets

ENTERPRISE SERVER FOR COMMUNICATION FOR A SUPERVISORY CONTROL AND DATA ACQUISITION (SCADA) SYSTEM

The present application is a continuation-in-part application, which claims priority to patent application Ser. No. 09/826,578 filed in the U.S. Patent and Trademark Office on Apr. 5, 2001, now U.S. Pat. No. 6,950,851.

FIELD OF THE INVENTION

The present invention relates to an enterprise server for an integrated automation system that has utility in the refining, petrochemical and chemical processing industries as well as the oil and gas production industry, metal manufacturing industry, maritime drilling businesses and environmental monitoring. In addition, the present invention relates to a system for use with electrical production and distribution, waste treatment and distribution, wastewater treatment and gas pipelines and distribution.

The invention specifically relates to a server for Supervisory Control and Data Acquisition (SCADA) systems. In addition, the invention relates to method for communication using a SCADA system including use of Intelligent Electronic Devices, which are also called remote terminal units in this application or "(RTU)".

BACKGROUND OF THE INVENTION

The automation industry has had major developments in the implementation of SCADA monitoring and control systems. A need has long existed for an integrated system, which uses small PC's to run factory lines, and other large manufacturing facilities.

The integration problems were rampant in the industry. Either, hosts were inadequate or defective. A unique enterprise server was developed to facilitate the integration of software.

1. A need has long exists for a less expensive RTU.
2. A new board has been desired to reduce the costs of RTU by at least 25%.
3. A need has existed for a system, which works faster than traditional host systems.
4. A need has existed for an improved SCADA system and method of communication, which can talk to more systems as host more than traditional systems.

A vital part of any process control system is the initial communication and periodic point-to-point communication of the system, including the process input values, the database, the displays and the like. Such a communication procedure is associated with a SCADA system, which in its most generic definition is essentially a process control system. The components of a typical SCADA system comprise a SCADA device and one or more remotely connected Intelligent Electronic Devices. As used herein, the term SCADA device is used as a convenient shorthand for what may be a collection of electronic equipment, including a computer based controller, which can be a server, also termed the "enterprise server" that is used to remotely monitor communication and/or control the operation of one or more remote RTU's such as relays, meters, transducers and the like. In general, the enterprise server is located miles away from the RTUs presenting many SCADA system communication difficulties. However, such a definition should not preclude an enterprise server being located much closer, even in the same plant as the RTU or RTUs.

Communication for a SCADA system traditionally has been very time and labor intensive. The initial set up of the RTU required an expensive technician to go into the field to configure the RTU. Subsequent maintenance communication has also been particularly time and labor intensive where the RTU is in an extremely remote location, such as on a mountain top or under snow on a pipeline in Alaska with respect to the enterprise server. In such a case, transportation and communication problems have been abundant. Therefore, reducing the time and effort required to run communication of a SCADA system while insuring that the SCADA device database and overall SCADA system operation meets the highest possible accuracy standards would provide substantial cost advantages over current communication procedures.

Traditionally, RTU configuration has involved steps of:

1. Assembling and transporting to the RTU location a collection of complex and expensive test equipment and signal generators that are required to produce the needed configuration.
2. Requiring an expensive technician at the remote location to inject the data into the RTU's inputs.
3. Requiring a second expensive technician at the central location(s) to verify the RTU is correctly processing according to the new configuration.
4. Such a system presents many drawbacks. For example, two technicians at disparate locations are required to perform the service. One of the technicians may be required to travel long distances. Moreover, in most SCADA systems, the RTU must be disconnected from the process that it is monitoring and/or controlling, which may affect the process under control.
5. There is a need for method and apparatus that address the shortcomings of present communication of a SCADA system. These needs are now met by the present invention.

SUMMARY OF THE INVENTION

An enterprise server for communication for a supervisory control and data acquisition (SCADA) system, comprising: configurable server software running on memory in a computer; a configurable server interface adapted to receive at least one client request from at least one client application for specific device status data and providing those requests to the server software; a configurable protocol interface with the server software for building a message for the specific device using a device protocol; a configurable connection interface for connecting to said specific device and enabling the message to be transmitted to the specific device and receiving the specific device status data from the specific device and transmitting the status data to the server interface using the device protocol; and caching the status data on said memory in said computer as cached data from the configurable server interface.

BRIEF DESCRIPTION OF THE FIGURES

The following detailed description of the preferred embodiment is better understood when read in conjunction with the appended drawings. For the purpose of illustrating the invention, there is shown in the drawings an embodiment that is presently preferred, it being understood, however, that the invention is not limited to the specific methods and instrumentalities disclosed.

DETAILED DESCRIPTION OF THE EMBODIMENTS

Figure 1:
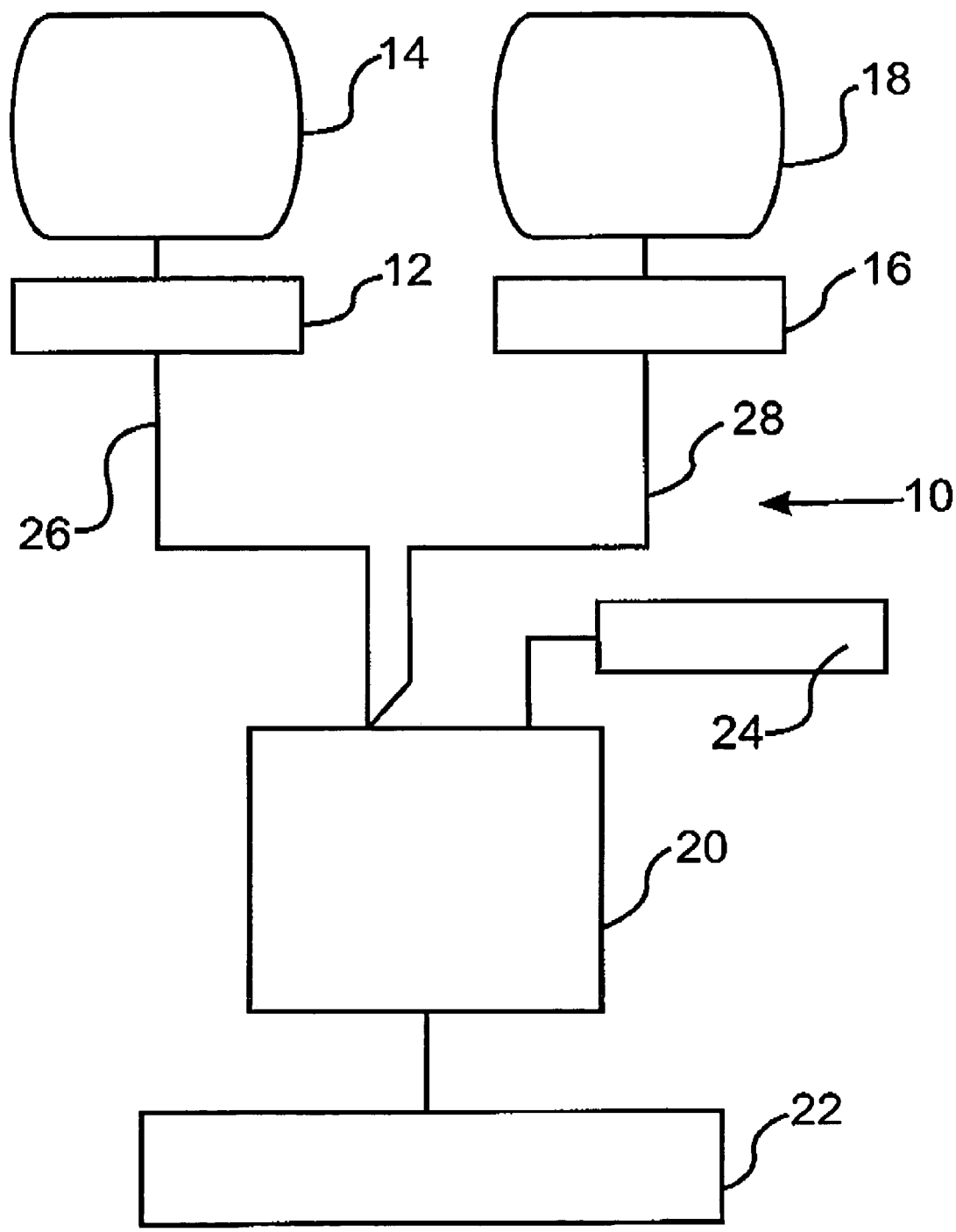
FIG. 1 is a SCADA system according to the invention.

Referring now to FIG. 1, there is shown a SCADA system 10 of the present invention. As shown, the system comprises an enterprise server 12, which has a display device 14 for displaying data to a human operator (not shown). A second enterprise server 16 can optionally be connected to the system, which may have a display device 18 connected thereto. An RTU 20 such as a microprocessor-based relay, which monitors and/or controls a physical process 22, and an optional local computer 24 for configuring RTU 20 locally.

RTU 20 communicates with enterprise servers 12 and 16, via a connection called TAC 26. TAC 26 can reside on server 12 or between server 12 and server 16, or on local computer 24.

Software termed the "AES" 28 is the configuration tool, which can communicate with the RTUs. Configuring occurs by use of a configuration tool, ARME. The AES can reside on the server 12, 16, or between 12 and 16 or on the local computer 24.

Generally, in this system, the RTU measure physical properties and can be remotely configured by the AES 28. Additionally, the RTU's can run simulations, and provide that data to the enterprise server 12 or 16 based on instruction via the AES.

For a simulation, a, SCADA system 10 requires communication with RTU 20 and the enterprise server 16 and/or 12 or even others.

The AES provides by RTU 20 with simulation instructions so the RTU can run tests without the need for an operator or expensive test equipment to inject a new configuration of an RTU into system 10. Moreover, RTU 20 can continue to monitor and/or control process 12, while the simulation is running.

Figure 2:
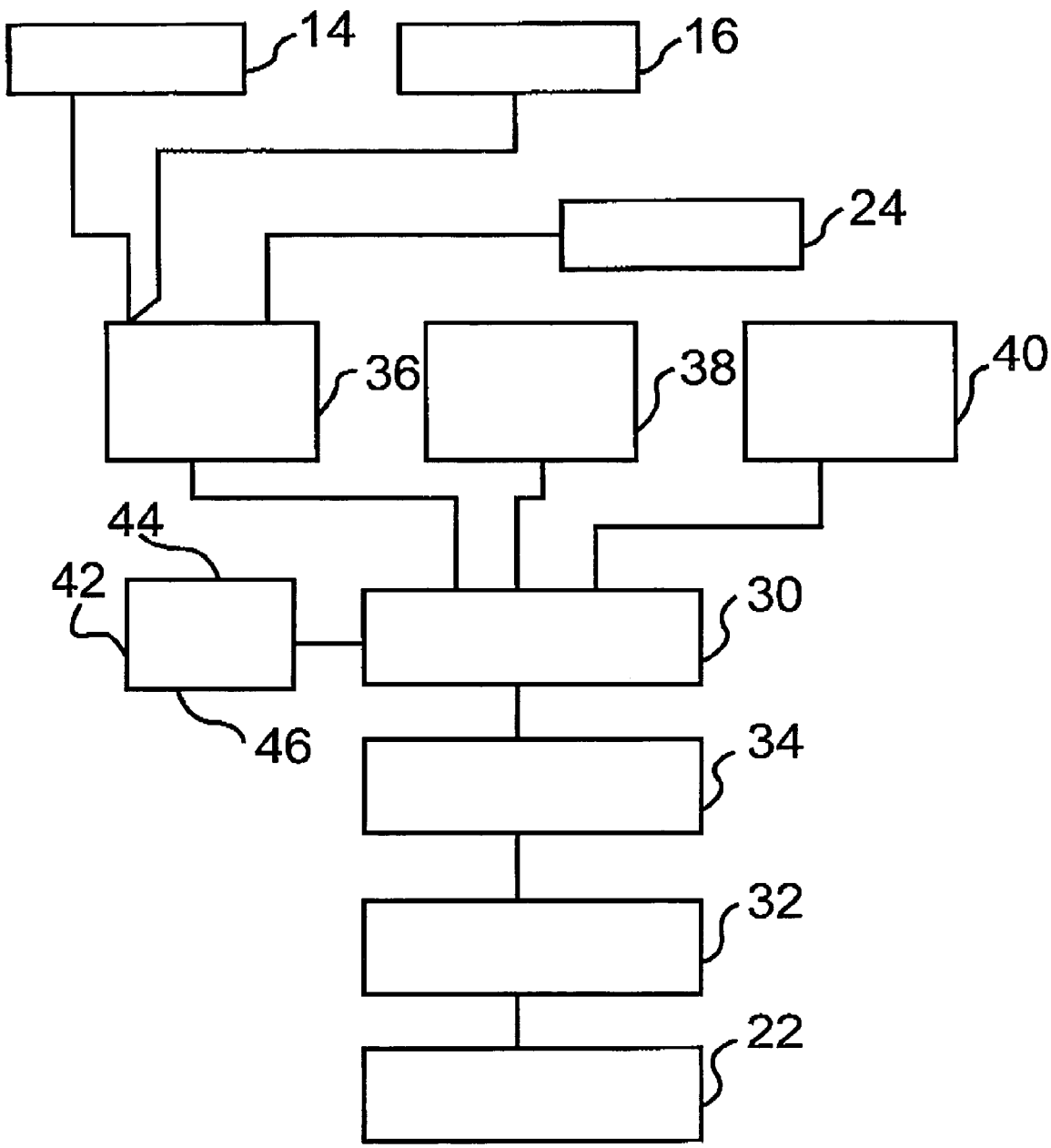
FIG. 2 provides a detail of an RTU of the present invention.

Referring to FIG. 2, an exemplary RTU 20 is shown in further detail. As shown, the essential parts of RTU 20 comprise a microprocessor 30, an analog-to-digital converter (ADC) 32, a digital signal processor 34, a communication interface 36, such as at least one bi-directional port or one or more directional input ports or interfaces, or output ports or interfaces 38, a user interface 40 and a memory area 42. Memory area 42 comprises both Read-Only Memory (ROM) and Random Access Memory (RAM) and comprises both a program memory 44 and a communication port register memory 46, which includes a command register.

As with many standard RTUs such as the microprocessor-based relay, RTU 20 measures aspects of a physical process 22 such as currents and voltages and converts the measured values into a digital equivalent via ADC 32 and digital signal processor 34. Microprocessor 30 moves the digital representation of the measured values into memory area 42 where the data can be accessed by programs and external devices such as an enterprise server. Moreover, microprocessor 30 can perform various predetermined functions on the data, such as fault detection as in the case of a relay, or control the process. Microprocessor 30 is also in communication with communication interface 36, also known as the AES so that data (i.e., digital representative data) can be transferred to an external device such as enterprise server 14 or 16 or both, or even more servers.

Additionally, communication interface 36 (the AES) allows an external device such as local computer 24 or enterprise server to provide commands and data to RTU 20.

Input/output interface 38 is coupled to microprocessor 30 and provides binary input signals from a controlling device. Moreover, RTU 20 provides control signals to the controlling device such as a breaker close or open signal if the controlling device is a circuit breaker.

User interface 40 provides a local mechanism for gaining access to the data in memory 42. In this way, a local operator can provide initial configuration data to RTU 20 or check the status of data within memory 42.

Figure 3:
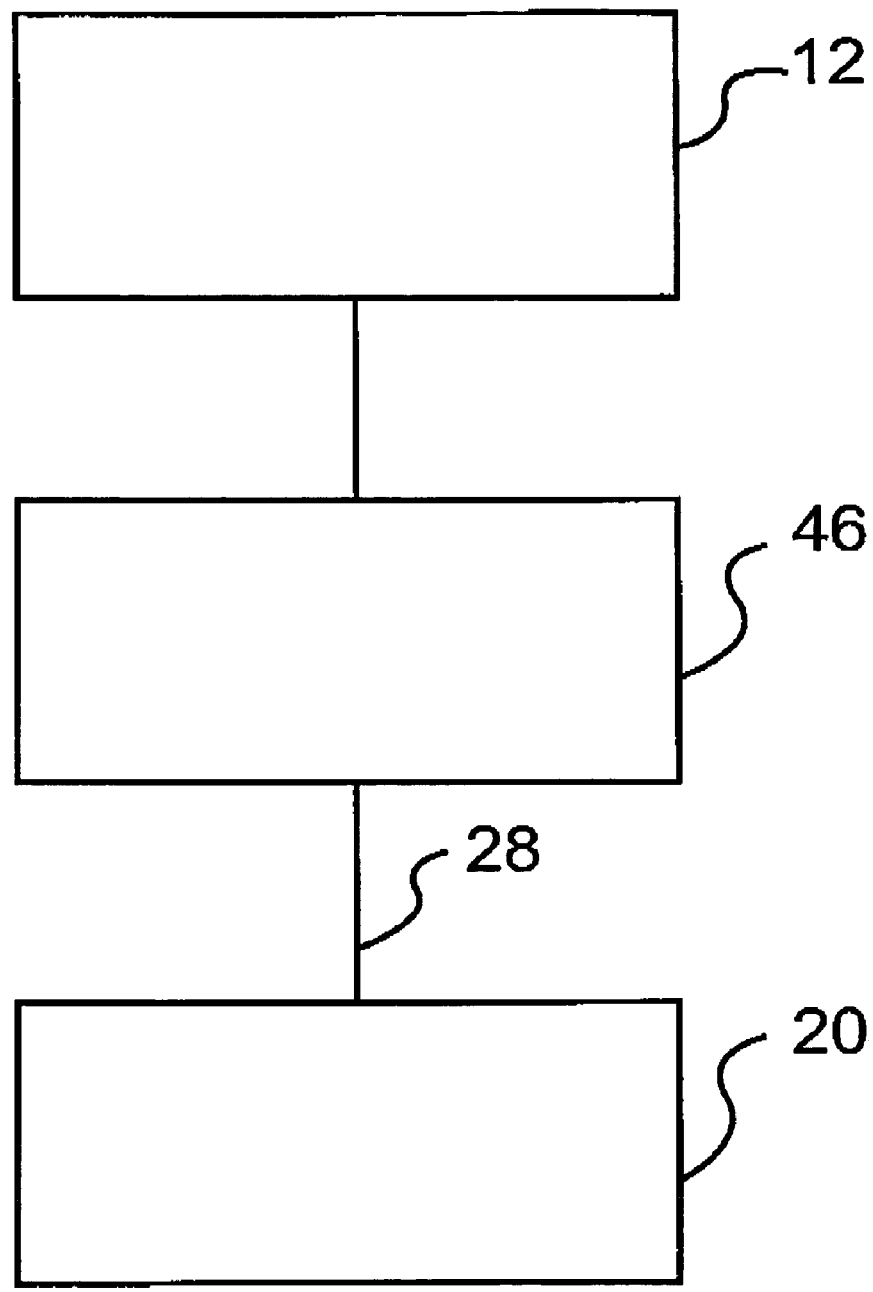
FIG. 3 is a detail of a user interface with an enterprise server.

FIG. 3 shows the detail of the reconfiguration process. For reconfiguration while an RTU is on line, a user interface 46 provides input parameters to the RTU via an input device such as a keyboard or a keypad at the server 12. Additionally, interface 46 may display communication data from the RTU allow a user to change the values for the data stored in the RTU. Alternatively, this same user interface 46, can initiate steps to place RTU 20 is in a simulation or test mode.

Significantly, user interface 46 provides another mechanism to command RTU 20 and place RTU 20 either "off line" or into a "sleep mode". Specifically, user interface 46 can be used to remove specific tasks by interval or entirely from the task list initially installed in the RTU. This same interface permits additional tasks to be added to the RTU. If a task is deleted from the RTU, or if the RTU is put into periodic "wake up" mode, the RTU will not store data in memory, or transmit. This feature is particularly useful for a system to be used on long space flights, where the Houston Johnson Space Center needs to only "wake up" certain RTU's at periodic times.

Additionally, user interface 46, which interacts with the AES program 28 permits a user to request internal diagnostics from the RTU to determines the internal status of RTU 20 such as memory failure or processor failure while all other RTU and servers remain on line.

Figure 4:
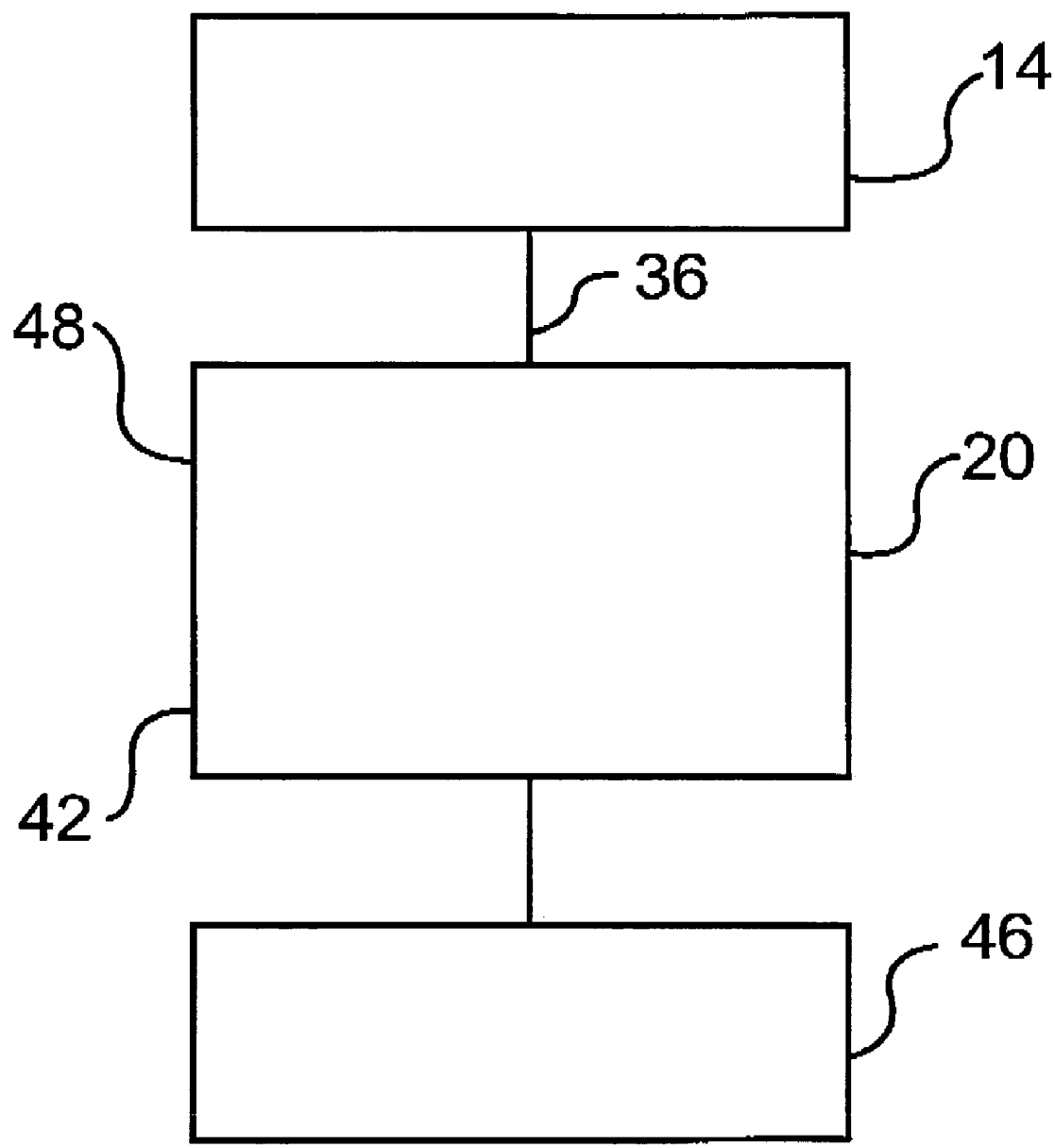
FIG. 4 a diagram of the external systems used in the invention.

Referring now to FIG. 4, a flow chart is shown that depicts the interaction of an RTU for metering electricity with a SCADA system of the invention. During normal operation, a metering module 46 writes metered values to register memory 42. Moreover, input/output task 48 writes binary status values to register memory 42. The register memory values written by metering module 46 and input/output task 48 are, then transmitted to the enterprise server 14 for further processing. As described in above, communication port with communicates with the AES controls the interaction between RTU 20 and enterprise server 14. For clarity and brevity, the communication process is described in reference to communication interface 36.

During a typical communication sequence (i.e., normal mode) three steps are performed. First, a command is received via communication interface 36 requesting the transmission of data values from memory 42. The data values are then retrieved from memory 42, and prepared for transmission via the AES, for example, properly formatting the data. Finally, the prepared response is transferred to the external device via the AES. An encapsulation layer (GEL) is also used.

The following terms are used here in.
1. The term "SCADA" means Supervisory Control and Data Acquisition Systems.
2. The term "ARME" means the RTU configuration or maintenance tool for the SCADA system. ARME is an OPC Client that communicates through the AES that allows RTU's to be remotely reconfigured after deployment. TAC combines with AES to provide a data acquisition front-end for relational databases.
3. The term "TAC" means The AutoSol Connection, which is a data acquisition front-end connection for databases.
4. The term "GEL" means Generic Encapsulation Layer.

The invention relates to communication technology which can simultaneously handle multiple types of telemetry and different protocols from various remote terminal units, such as custody control computers for pipes lines, pump off controllers, non-specific controllers, and water meters.

The invention is a server-based system that can provide information to a wide variety of client server interfaces, with the only limitation on capacity being bandwidth and processing power.

The invention works with lease line, radio, public switched telephone networks, cellular phones, and satellite and Internet telemetry reception.

For example, this invention could handle the communication for utility metering for an entire city. Multiple servers of the invention can be used, and the servers can be used in parallel to each other, and enable millions of terminals to receive and transmit communications to a central server and enables the utility to configure millions of RTU's at once.

The invention involves several features, an AES communication tool which has as the new benefits, the ability to conserve resources within an operating system including, memory, and the number of threads, which can be run through Microsoft NT. This new SCADA system was developed to handle these and other objects, including an ability of the user to assign threads to specific ports to conserve thread.

The AES communication system is capable of handling communication systems with over 100,000 RTU's while continuing non-stop communication with no downtime. The AES component enables the user to add or delete RTU while continuing to operate and function on line. This AES component also enables the user to add additional servers to the AES while the user is on line, without downtime.

The AES, is essentially a windows-based OPC server, (object linking and embedding for process control), which communicates with a plurality of RTU's simultaneously. The present invention relates to a window based communication server that permits digital communication to a field device, and enables the user to digitally connect or disconnect any one or more of the RTU while the system is operating on line. There could be at least 1000 RTU's engageable and disengageable while the system is on line. The system includes hardened computers suitable for performing remote automation in environmentally exposed locations using software compatible with the Windows 98, NT and 2000 operating systems.

The hardware of the invention is capable of performing remote control, alarm detection, data acquisition, and data management functions. The software provides communication to RTU's via telemetry systems, acquired data management via commercially available databases, such as Oracle, Microsoft Access, Microsoft SQL server, and Cybase and RTU status and performance values and parameters to data centers.

The AES preferably runs as an NT server. AES has:
1. Connection modules, which are connected from a standard port, and include:
   a. TCPIP
   b. Dialup
   c. Serial
   Other modules could be added depending on the hardware interface, such as an ARC NET connection module; and
   Protocol Modules—the messaging language
   d. Enron Modbus protocol module
   e. ABB total flow module SCADA system hardware usable in this invention includes at least one such as the RTU 3000, 4000E or 5000E. These models have different I/O capability, with the 3000 unit being the smallest and only communication ports to meet different application requirements and budgets.

The inventive SCADA system includes:
1. ARME;
2. AES,
   a. Communication Software that is an NT Service
   b. Configuration Software which is an ActiveX Control, and
3. TAC.

The ARME is the RTU configuration or maintenance tool for the SCADA system. ARME is an OPC Client that communicates through the AES that allows RTU's to be remotely reconfigured after deployment. TAC combines with AES to provide a data acquisition front-end for relational databases.

TAC not only is an OPC Client but also has an ODBC interface that is compatible with all leading relational database products.

The ActiveX AES Configuration Software merges with any other software that is an Active X container to allow modification of the AES Communication Software. The AES Configuration Software has specific features that allow the remote configuration of the AES Communication Software, such as over the Internet. The AES Configuration Software provides a set of windows that allows the end user to define the communication desired with the RTU. For example, if a client wants to communicate with a "Total flow" instrument, a window allows the user to set up the connection type, and then set up a virtual port associated with that connection type. A Windows Interface allows the user to select a serial connection type or serial port, and define multiple virtual ports, which are associated with an actual port, such as a COM Port 1. Next, the user selects a protocol, such as Modbus. The user then defines a device, which is to be communicated with via the Modbus protocol. All communication parameters are then selected and then the AES Communication Software is setup for communication with the device through the port.

The AES Configuration Software can modify an offline database where the interface is OLE DB. This feature allows the invention to be compatible with any relational database. When a new device is selected, or new parameters are entered, the changes that are made to the offline database are automatically assimilated by the AES Communication Software.

AES and ARME and TAC run on Microsoft Windows 98TM, NTTM, or 2000TM. The host system (personal computer) requires a minimum of 66 MHz processor speed and a minimum of 16 Megabytes of RAM. The preferred system would be a 500 MHz process with at least 125K of Ram.

The host system's operating environment must be Microsoft Windows 98™, NTTM, or 2000™, with 2000™ being the preferred operating system. The invention is compatible with Win32API. The modular design, based on COM Objects, a Microsoft standard, allows the present invention to be extended to support different connection types and protocols.

Communication can be established between a Microsoft Windows base computer and an RTU immediately upon powering the RTU and without RTU configuring or programming.

Automation functionality in the RTU can setup through the following method:
1. Step 1: Select an automation function to be executed in the RTU from the functions available in an ARME program.
2. Step 2: Select additional parameters associated with the specific function.
3. Step 3: Communicate the function from ARME through the AES to the RTU;
4. Step 4: Optionally functions can be added to a function map and portions or all of the function map can be communicated from ARME through the AES to the RTU;
5. Step 5: Optionally functions can be added to a function map and communicated from ARME through AES simultaneously to many RTU's;
6. Step 6: Reconfigures existing RTU's via the AES with new function maps simultaneously.
7. Exemplary function blocks that solve data processing application problems include:
    a. Staging function block,
    b. Analog alarm function block,
    c. Gas metering calculation block,
    d. Digital alarm blocks,
    e. Archive blocks containing historical measurement or data records with date stamps
    f. The ARME consists of function maps.

At least one library of function blocks that can be included in each map. The ARME has customizable function block ability; enabling end users to self develop and customize function blocks with a VB language. The ARME overwrites a Simulation Environment to simulate a function map in a host computer prior to loading the function map in an RTU. The ARME can download function maps to RTU; upload function maps from RTU's; and synchronize to one or more RTU's with the internal computer clock.

The RTU has a software component termed "the soft RTU" which is loaded on the hardware, the "RTU hardware." The soft RTU has a special operating system, which executes on the function maps, which are downloaded to the RTU.

The hardware interface layer is called the Generic Encapsulation Layer or GEL. This hardware interface contains all the low-level communication programs, which enable the soft RTU to communicate with the Enterprise server. Some of these programs include, timing programs, communication buffers, I/O scanners, memory management, real time clock, power management routines.

To operate the soft RTU, controls in individual function blocks indicate to the operating system of the soft RTU when they should execute. The default configuration of the soft RTU enables immediate communication of the RTU with SCADA system at the moment of power up. Access to all I/O points on the RTU is also granted at the moment of power up.

RTU 4000 of the present invention is designed so that all hardware features can be configures from ARME. This means the user no longer has to have dipswitches, plug in modules, or jumpers. This saves time so that all hardware options with regard to I/O and communication are set in software only. There is only one reason to open the box of the RTU of the invention that is to activate the lithium battery, which is good for at least 10 years.

Features of the novel RTU include the ability of the RTU to put itself to sleep, based on change of status. It can be set to wake up periodically, or be woken up by telephone. It can be put to sleep periodically as well.

The invention contemplates using 8 analog inputs, which can be current, or voltage inputs and the input that are desired, can be picked by the software of the soft RTU.

A multifunction I/O point can be set up as (a) a digital input, a digital output, initializing off, initializing on, a low speed counter and a low speed counter of 0–10 kilohertz, a high speed counter of 125 Kilohertz to 400 kilohertz, a pulse output, a quadracure decoder.

It should be noted that Com Port 1 is always, 232, Com Port 2 and 3, can be RS 232 or RS 235 and be software configurable.

Very little power is required by the RTU when it is asleep. It can be powered for 10 years on the one battery.

In a preferred embodiment, a 12 VDC power supply can power the RTU 4000E. While terminating power supply wires to the RTU be sure to the power supply is off. A 12 VDC power supply or battery can be connected to the (+) 12 VDC terminal and the (−) 12 VDC (The power supply common should be terminated here. After connecting the power supply wires to the RTU, Turn-On the supply. Power-up should be indicated by the 12 VDC pilot light, which can be used as an indicator to check power connections.

Once the RTU is powered the next step is to establish communications between the RTU and preferably an Intel computer equipped with Windows 95™ or Windows NTTM. The RTU initially, permits direct wiring of the RTU, however, just after power up with RTU may be configured to communicate via radio, lease line, internet or public telephone, however the following procedure will enable a user to use a default configuration to connect.

For direct communication a standard Null Modem cable should be connected to one of the three RTU 4000EE serial ports (DB9 Male serial connectors) and to COM2, the second serial port on the Intel computer. If COM2 is not available, other COM Ports may be used. To use other COM Ports, attach the serial cable to the desired COM Port's and Configuring Ports.

The AES is compatible with Window 95™ or Windows NT™. AES supports communication with various RTU's and other vendor products through a computer serial port or network card. Other software packages can communicate with the RTU through AES and its DDE (Dynamic Data Exchange) or OPC (OLE for Process Control) Server interface.

AES is installed by running an SETUP.EXE program as follows:
1. Start Windows 95™, Windows NT™
2. Insert the distribution diskette into a floppy drive
3. From the Windows Program Manager, invoke the File/Run… command.
4. Enter A:\SETUP (or B:\SETUP.EXE if the diskette is in drive B) and click on the OK or press <ENTER> key. The Setup dialog box will appear:

The RTU 4000E1 is a hardened industrial controller suitable for installation in environmentally exposed locations. The RTU's 32-bit Motorola 68332 processor, 256 Kbytes of battery backed Static RAM and 16 Mbytes of Flash RAM provide strong computing power to perform complex control and data management activities. The RTU 4000E1 has three serial ports that can be used for communication with host computers, pagers, subordinate RTU's, I/O, analyzers and/or other vendor PLC's and RTU's. Lastly, the RTU 4000E1 has 53 I/O points that can be interfaced to instruments and actuators to measure and effect changes to process or equipment status'; and conditions.

When power is initially applied to an RTU 4000E1 the Factory Default; configuration retained in the RTU's flash memory is loaded to static RAM where it is executed. (The active configuration in static RAM is the On-line configuration.) This configuration allows immediate access to the RTU's I/O through the serial ports and the Modbus protocol on power-up. To setup the unit for an automation purpose the user can develop a configuration from a library of Function Blocks embedded in the RTU 4000E1 with the ARME configuration tool. Once loaded, this new configuration replaces the Factory Default and is called the User Default configuration.

The RTU 4000E1 is preferably packaged with a metal mounting plate and cover. This packaging provides RFI protection but does not provide environmental protection from moisture, dust, corrosive chemicals and atmospheres. In addition, the RTU is not suitable for installation in industrial areas that have a hazardous classification. Additional packaging however, can often meet these requirements.

The RTU 4000E1 has Power Input terminations and Battery Input terminations as shown in FIG. 3. These power inputs are ordered in the RTU power circuitry such that if one source is removed, the RTU will draw from the remaining power source. The Power Input terminations are the primary power source and can accept from 11 to 30 VDC. The Battery Input terminations are intended for a system back-up battery and will accept from 9 to 14 VDC. Circuits associated with the Battery Input will also trickle charge the back-up battery as long as 11 to 30 VDC is applied to the Power Input terminations. Should the Power Input voltage fall below 11 VDC the RTU will automatically draw from the Battery Input power source. When the Power Input voltage returns to a level between 11 and 30 VDC the RTU again draw power from the Power Input terminations and trickle charge the backup battery. When input voltages fall below 9 VDC, a low voltage cutout will protect the RTU from indeterminate states that can occur.

LED indication of the status of power at the Power Input terminations and the Battery Input terminations are provided on the face of the RTU above the Reset button. When power is applied to either the Power Input or the Battery Input terminations the LED will be visible. When power is only applied to the Battery Input the LED will also be visible.

RTU 4000E1 has two grounds, which serve different purposes and must not be connected during the installation process. Transients, radio frequency interference (RFI) and over-voltage protection circuitry in the RTU are designed to transfer these disruptive or destructive signals to earth ground. The protection circuits connect to the mounting plate through mounting pads on the RTU circuit board. The installer should take care to insure that the mounting plate is also connected to a reliable earth ground. In addition the installer should collect all of the shields associated with instrument cables/wiring to RTU I/O at the RTU end and should connect these shields to earth ground.

The digital grounds associated with Digital I/O, Multi-function I/O and Analog I/O is connected within the RTU to Power Input and Battery Input grounds. As indicated in the Power and Battery Backup section above these grounds should be connected to the Common terminal of the power supply and/or to the Negative Terminal of the Back-up Battery.

An internal lithium back-up battery is provided in the RTU 4000E1 to maintain static RAM and the Real Time Clock when power is removed from the Power Input and Battery Input terminals. Current control set-points or targets, accumulated values and alarm thresholds that are being executed in static RAM may be different from those of the initial configuration maintained in flash RAM. The lithium battery, with a nominal life of 10 years, will maintain all of these settings in static RAM. It is necessary however, to install a jumper on the RTU circuit board to activate the internal back-up battery. To install, remove the RTU cover and locate the jumper next to the lithium battery in the upper right hand corner of the RTU circuit board. Press the jumper on the two pens and replace the RTU cover.

The user can control power consumption in the RTU to a large extent. Under normal operating modes the RTU nominally draws 115 amps at 14 VDC from the Power Input source. This does not include the additional power draws of instrumentation, telemetry hardware or other devices that may be included in an RTU installation. The user can reduce this power consumption by putting the RTU in a sleep mode on an interval or on an event. This capability can be configured through the ARME. In the Sleep Mode the RTU draws 13 mA at 14 VDC from the Power Input Source. Finally, further reductions can be made by selectively or completely deactivating LED indications on the face of the RTU. Again this feature is configured through ARME.

The RTU's are designed to monitor and control assets in environmentally exposed installations and to receive supervision regarding that mission from a remotely located data center. As a result, flexible communication to data center computers is a key capability. The RTU 4000E1 has three serial ports that can be individually configured for Master or Slave communications, different Modbus Slave IDs, communication parameters, hardware handshaking, password protection, privileges, and telemetry methods.

On initial power-up RTU 4000E1 I/O is accessible through any of the three serial communication ports and the Factory Default serial port values. The default settings for the serial ports are given in Table 1 below.

The RTU I/O is also accessible through the Modbus addressing provided in Table 2 below. Note that the address of some points is dependent on the configuration. The address for the default configuration of a particular I/O point is indicated in bold. As indicated in Table 2, all of the I/O in the RTU 4000E1 have pre-assigned Modbus addresses with the exception of the two analog outputs for whom holding addresses are assigned by ARME.

In addition to the default configuration detailed in Table 1, RTU 4000E1 serial ports default to the RS-232 electrical standard. COM Ports 2 and 3 however, can be configured by ARME to support RS-485. FIG. 4 shows the locations of the COM Ports and associated LED's. LED's are provided to indicate the status of serial communication lines. In addition, the indicators located to the left of the Port 2 and 3 LED's; indicate whether these ports are configured for RS-232 or RS-485. The RTU 4000E1, which is a DTE device, is connected to computers and modems through standard serial cables. When connecting to computer serial ports a Null Modem cable should be used. When connecting to a modem or a radio modem a Straight-through cable should be used. Additionally, when communicating through modems that require hardware handshaking the cable will require the RTS, CTS and DCD lines in addition to TX, RX and GND.

In the preferred embodiment, the CPU is a Motorola 68332 16 MHz having 512 KB Static RAM and 4 MB Flash RAM.

The preferred temperature range for operation of the SCADA system is −40 deg C. to 85 deg C.

The Analog Inputs Software are Selectable 0 to 5 VDC or 4 to 20 ma.

The Analog Output Software Selectable 0 to 5 VDC or 4 to 20 ma.

The Multifunction I/O's can be configured in the software as:
1. Digital Inputs (DI),
2. Digital Outputs (DO),
3. Low Speed Counters/Accumulator (LSC),
4. High Speed Counters (HSC),
5. Pulse Outputs (PO),
6. Quadrature Decoder (QD), or
7. Pulse Width Modulation (PWM).
8. DI Mode—5/12/24 VDC Sink
9. DO Mode—5/12/24 VDC Sink
10. HSC Mode—125 Hz to 100 KHz @ 5 DC to 36 VDC
11. LSC Mode—0 Hz to 10 kHz @5 VDC to 36 VDC
12. PO Mode 125 Hz to 100 kHz @ 5 VDC
13. PWM Mode 125 Hz to 100 kHz Duty Cycle Add-on modules can convert any of these 11 points to additional Analog Inputs, Thermocouples Inputs, RTD Inputs, or Analog Outputs.

There are 32 Digital Points in the software and include:
1. Digital Inputs (DI) 5/12/24 VDC Sink
2. Digital Outputs (DO) 5/12/24 VDC Sink
3. LED indication for all Digital Points
4. Transient Protection
5. Compliant with IEEE 472 and ANSI 37.90.

The Serial Communication Ports are preferably:
1. Port 1 EIA-232, full handshaking, DB-9 Male.
2. Port 2 EIA-232/485, software selectable, full handshaking, DB-9 Male.
3. Port 3 EIA-232/485, software selectable, full handshaking, DB-9 Male.
4. LED indication of Port 2/3 EIA-485 mode.
5. LED indication of DTR, TX, RX, DCD, RTS, and CTS for each port.

The Power Supply is preferably set with:
1. Three power modes: Un-powered, Sleep, Operational
2. Primary Power Input
3. Power Requirement 11–30 VDC
4. Operational Mode: Minimum power draw is 115 amps @ 14 VDC plus @ 1.8 amps/LED
5. Sleep Mode: Minimum power draw is 13 amps @ 14 VDC
6. LED indication when powered by Primary Power source
7. Back-up Battery Input
8. Power Requirement 9–30 VDC In the Operational Mode, the minimum power draw is 102 amps @ 12 VDC plus @ 1.8 amps/LED In the Sleep Mode:
1. The RTU is configured to enter Sleep mode by software logic.
2. The RTU awakens upon:
3. Return of power
4. Alarm Clock setting
5. Modem ring indication The preferred overall dimension of the RTU is 6.14W×11.5L×1.35H with mounting plate.

The firmware of the RTU's control, data acquisition, alarm and event, and data logging capabilities are configured with the RTU Maintenance Environment (ARME). In addition all hardware options are configured from ARME. No hardware jumpers, switches or plug-ins are required.

The RTU 4000E supports the Modbus protocol standard, and can monitor 17 million RTU Addresses, provide:
1. Exception Reporting
2. Scatter Reads (Registers do not have to be contiguous.)
3. Mixed Data Type Messaging, and
4. Security/Access privileges configurable per port, which are
   a. Read Only
   b. Read/Write, or
   c. Read/Write/Configure.

The master protocols supported by the invention include:
1. Modbus ASCII and RTU
2. Daniels Modbus ASCII and RTU
3. Enron Modbus
4. Rosemount 3095 Modbus
5. Extended Modbus
6. Yokagawa Power Quality Monitor Slave protocols supported include:
1. Modbus ASCII and RTU,
2. Daniels Modbus ASCII and RTU,
3. Enron Modbus,
4. Extended Modbus.

For Data Acquisition, on power-up all RTU I/O is accessible via EIA-232 and Modbus addressing, no programming required. In addition,
1. Data archival sampling rates are configurable from seconds to hours.
2. RTU flash RAM that is available for data archival can store 365 days of hourly data for 24 points. Over 250,000 records available for storage.

The invention allows up to 100 function blocks can be configured to address control, data acquisition, data logging or alarm applications. The function blocks can be:
1. Accumulator/Totalizer Block
2. AGA Block Compressible Fluid
3. Incompressible Fluid
4. AGA 3
5. AGA 8 Detailed
6. AGA 8 Gross 1
7. AGA 8 Gross 2
8. AGA7
9. Alternate Block
10. Analog Alarm Block
11. Analog Input Block
12. Archive Block
13. Boolean/Math Block
14. Cryout Block
15. Digital Alarm Block
16. LCD Block
17. Mapping Block
18. Momentary Block
19. On/Off Control Block
20. PID Control Block
21. Scale Block
22. Staging Block
23. Sleep Block
24. Stop Watch Block
25. System Block
26. Timer BlockValve Block
27. User definable Function Blocks via Soft RTU Toolkit The Enterprise Server includes:
1. On-line configuration supports non-stop communication with field devices.
2. Communication Server runs as a Service in Windows NT 4.0 and 2000.
3. Communication support includes,
4. Real-time data polling,
5. Archival data uploads from field devices, and
6. Exception reports or Cryouts from field devices.
7. Configuration tools are ActiveX controls that can be run in an OLE
8. Container Compliant HMI or Browser. Remote Administration Supported.
9. Embedded diagnostics logs performance information and forensics data to
10. ASI Viewer and/or Log File.
11. Most communication functions and controls are accessible to external applications through the OPC Server interface.
12. Embedded Client triggers,
13. Enables real-time data caching for OPC Client applications.
14. Automatic archived data uploads from field devices without OPC Client application.
15. Item aliases supported for protocol independent HMI/Client Application development.
16. Browsing supports protocol specific data types/items and Aliases.
17. Multiple protocols can be supported on a single communication channel.

Telemetry methods, which are usable in this invention, include:
1. Serial Cable, Leased-line or Serial Multi-drop,
2. PSTN and PPP via Modem,
3. Radio (Conventional, Trunking, and Spread-Spectrum Radio),
4. VSAT,
5. TCP/IP Ethernet, TCP/IP Ethernet Terminal Servers, and IP.

Protocols Modules include:
1. Modbus Module
2. Modbus RTU and ASCII
3. Omni 3000/6000 Modbus (Real-time Data, and History and Report Uploads)
4. Daniels Modbus RTU and ASCII (Real-time Data and History Uploads)
5. Enron Modbus (Real-time Data and History Uploads)
6. Flow Automation Modbus (Real-time Data and History Uploads)
7. ABB TotalFlow Modbus (Real-time Data and History Uploads)
8. Motorola MOSCAD Modbus
9. Delta X Modbus (Real-time Data and Dynagraph Cards)
10. Baker CAC Modbus (Real-Time Data and Dynagraph Cards)
11. User Configurable Register Sets
    a. Bristol Babcock BSAP Module
    b. ABB TotalFlow Packet (Native) Protocol Module (Real-time Data and History Uploads)
    c. ABB HCI-A Module (AAI Analyzers)
    d. Allen Bradley DF1 Module
12. Master-Slave (Half Duplex)
13. Point-To-Point (Full Duplex)
    a. Fisher ROC Module (ROC 300 Series, FloBoss 407, 500 Series) (Real-time Data and History Uploads)
    b. GE SNP Module
    c. GE 90 Series PLC Ethernet Module
    d. HP48000 Module (Real-time Data and History Uploads)
    e. Cutler Hammer—IMPACC System Communications Module
    f. Detroit Diesel DDEC Module (Detroit Diesel Electronic Controller)
    g. General Motors EMD MDEC Module (Marine Diesel Electronic Controller)
    h. Caterpillar ECM Module (Electronic Controller Module)
    i. Nautronix ASK Module
    j. Mercury ECAT, ER Module (Real-time Data and History Uploads)
    k. Teledyne CA, TGP Module
14. Preferred Server Interface Formats include:
    a. OPC (OLETM for Process Control)
    b. Microsoft CF_TEXT, XlTable
    c. Rockwell Software AdvanceDDETM
    d. Wonderware FastDDETM
15. The types of communication transactions include:
    a. Real-time Data
    b. Interval Polling at 15 different intervals (Periodic Timer Triggered)
    c. Slow Polls at 15 Intervals are a percentage of Polling Interval (Faster and Slower rates are supported.)
    d. Synchronous Polling (Clock or Calendar Triggered)
    e. Demand Polling (DDE/OPC Client Triggered)
    f. History/Archived data Uploads
    g. Interval Uploads at 15 different intervals (Periodic Timer Triggered)
    h. Slow Uploads at 15 Intervals are a percentage of Polling Interval (Faster and Slower rates are supported.)
    i. Synchronous Uploads (Clock or Calendar Triggered)

The AES can communication without an OPC request from an external Client. It provides more deterministic performances as real-time data items are constantly active. The data collected is cached for delivered to external Client applications via the Server interface. Provides standalone history/archived data uploads from field devices for storage in database or audit files without the requirement of an external Client.

Documentation and Configuration, the invention permits the following:
1. OLE DB interface support for all leading relational databases.
2. Database driven external configuration tools to ease maintenance of large applications.
3. Database driven reports to document AES configuration.
4. Database tools to support simultaneous configuration of HMI/Client Application and AES.
5. SCADA Capabilities, this invention allows:
    a. Client access to communication diagnostics for each telemetry channel and for each RTU/PLC.
    b. One AES installation to support multiple protocols.
    c. Multiple protocols can be supported over one communication channel.
    d. Client-Server interface to give a Client full control of all aspects of the server including:
        (1) Polling Interval
        (2) Demand Polling
        (3) Telephone number for dial-up
    e. AES redundant devices: RTU/PLCs.
    f. Automatic fail-over to back-up device
    g. AES supports redundant telemetry channels/methods to a single device:

h. Data Logging:
  (1) Uploaded data can be logged to any leading database via OLE DB.
  (2) EFM data uploads can be written to Flow Cal files or to Flow Cal Enterprise (Oracle) format.
  (3) User defined periodic file closing: file size control
  (4) User defined path to file location
  (5) User defined directory and file labels identify file content, date and time.
  (6) User defined automatic file purging: directory size control
i. Diagnostic Logging:
  (1) AES logs diagnostic and forensic data to an ASI Viewer and/or Log file.
  (2) Data that can be activated for Diagnostic Logging includes the following.
j. Message Errors
k. Send Messages
l. Receive Messages
m. Device and Item Activity
n. Status Changes
o. Client Data Received
p. Field Device Data Received
q. Event Notification from Ports
r. Receive Buffer Contents and Data
s. Item Name, Value and Quality
t. Changes in Client Status
u. Changes in AES Configuration
v. Data Flow Between AES Components
w. Performance Data regarding Threads
x. AES Footprint or Tracing Information The invention has as features:
1. Control, alarm monitoring, data logging, data acquisition, and communication functions of the embedded SoftRTU are implemented using ARME.
2. Data acquisition immediately on power-up without configuring or programming.
3. A fill-in-the-blank configuration interface that is used to setup RTU functions without programming.
4. Ability to reconfigure RTU's while they are on-line.
5. Loading of new configurations over the telemetry system.
6. Loading of RTU configurations to be uploaded and modified for downloading to other RTU's.
7. Configuration to archive data for periods greater than one year to nonvolatile memory.
8. Synchronization utilities between the RTU and the host computer.

This SCADA system can be used for:
1. Electrical Power Quality Monitoring
2. Electronic Flow Measurement (EFM)
3. Compressor Control
4. Wastewater Collection and Water Distribution Systems
5. Pump Control
6. Pipeline Valve Control
7. Surveillance
8. Environmental Monitoring
9. Traffic Control
10. Safety and Early Warning Systems Connection features are as follows:
1. Connection (TAC) is a data logger that has a DDE/OPC Client Interface.
2. TAC can acquire data from any DDE, OPC or ODBC source, and store the data via ODBC to any compliant database.
3. TAC can also retrieve data from the database and write the data to an RTU or PLC via the DDE/OPC Server.
4. Data is acquired on an Interval, External Trigger, Change in Value or Change of State, and synchronous with the clock.
5. Multiple logging or retrieval plans, called Schemes, can be configured to transfer data periodically or on event for various business, engineering, or research purposes. Each logging Scheme subsequently writes the data to its specific database file format or to a file.
6. TAC also has a Watch-Dog-Timer to insure data is not lost during a network failure or due to the loss of a network storage device. Data is logged to the secondary path on failure of the Watch-Dog-Timer.
7. The intervals at which TAC log files are closed are configurable for each Scheme.
8. The interval at which the directory for TAC log files is purged is configurable for each Scheme.
9. DDE formats supported include Microsoft formats and Advanced DDE.
10. TAC is especially suited for uploading time-stamped data from intelligent data acquisition and control systems.
11. TAC runs on Windows 95 and Windows NT.

Figure 5:
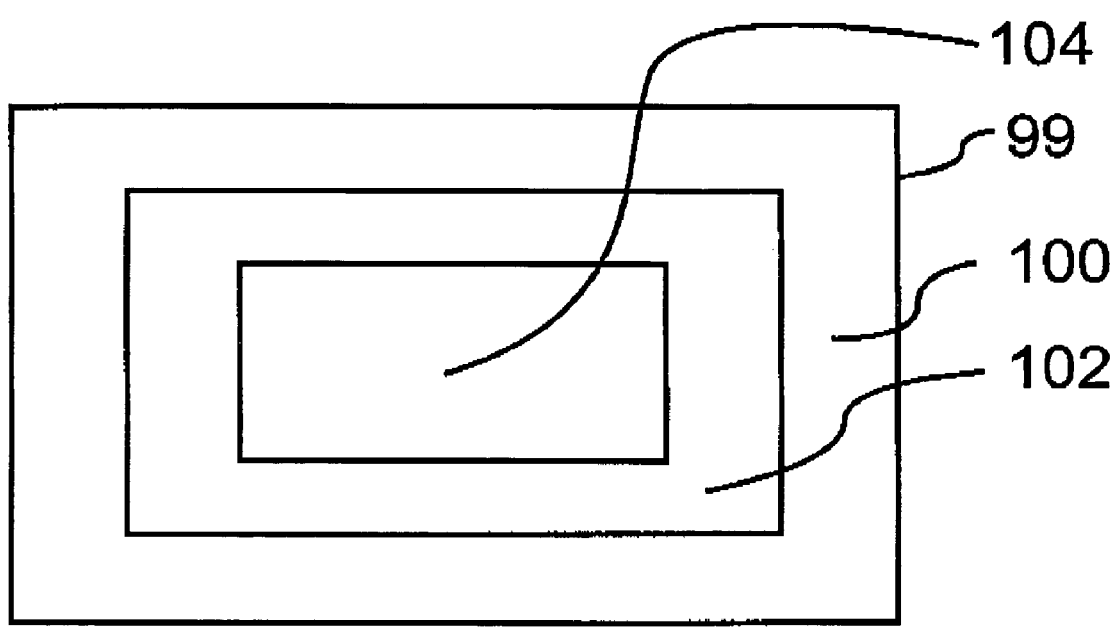
FIG. 5 is a diagram of an enterprise server according to the invention.

As shown in FIG. 5, an enterprise server 99 for communication for a supervisory control and data acquisition (SCADA) system has a computer 100 with memory 102 supporting configurable server software 104. The computer preferably runs on a windows-based operating system or an NT-based operating system.

Figure 6:
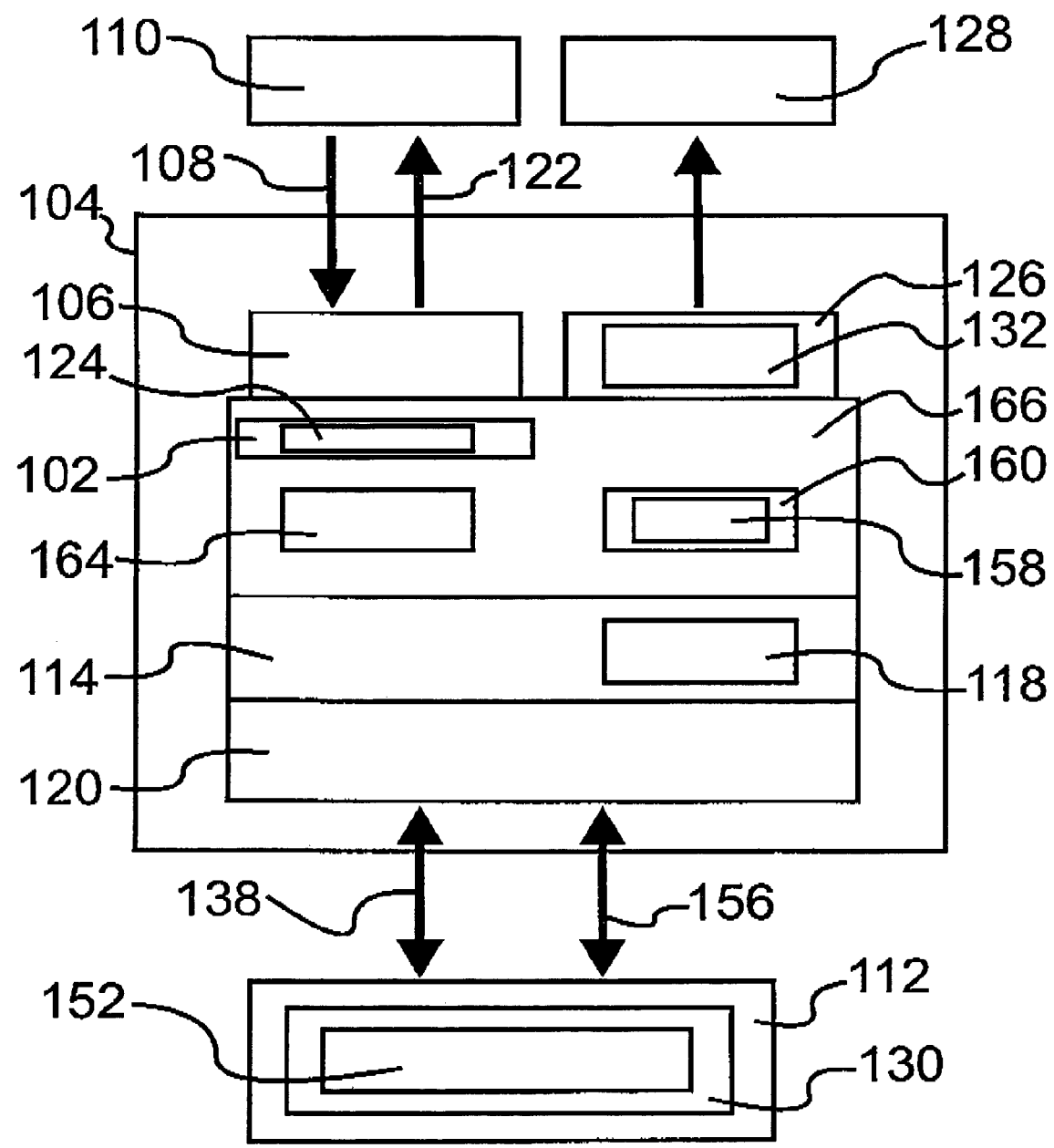
FIG. 6 is a diagram of a configurable server software with configurable interfaces according to the invention.

FIG. 6 shows the configurable server software 104 with four interfaces although only three are needed to operate the SCADA system. The configurable server interface 106 is adapted to receive at least one client request 108 from at least one client application 110 requesting status data 122 on a specific device 112 and the configurable server interface 106 provides those requests to the client application 110.

The configurable server interface 106 receives the client request 108 and responds with status data 122.

The configurable connection interface 120 connects to a specific device 112 through channel 138 enabling a specific command or message to be transmitted to the specific device 112. The configurable connection interface 120 receives status data 122 from the specific device 112 and transmitting the status data 122 to the client application 110. The status data 122 is also is cached on the memory 102 as cached data 124.

The server software can request this status data 122 concerning a specific device 112 at defined time intervals, such as at 1 o'clock, 3 o'clock and 6 o'clock pm each day, or on a one-time basis.

The server software of the invention can further include the ability to transmit the cached data 124 to a client application 110.

In a preferred embodiment the cached data 124 can include current operational information, historical operational information or both on a specific device 112.

The current and historical operational information can include pressure data, temperature data, flow data, maintenance repair data, battery limit data, leak detection data, equipment run times, plant conditions and combinations of these types of data, as well as other operational data.

In another embodiment, the configurable server software 104 can include a configurable database interface 126 capable of communicating with a database 128 for storing and compiling specific device datasets 130.

The configurable database interface 126 can comprise a communication protocol 132 for communicating with a specific device 112 for collecting specific device datasets 130 and writing the specific device datasets 130 to the database 128.

Figure 7:
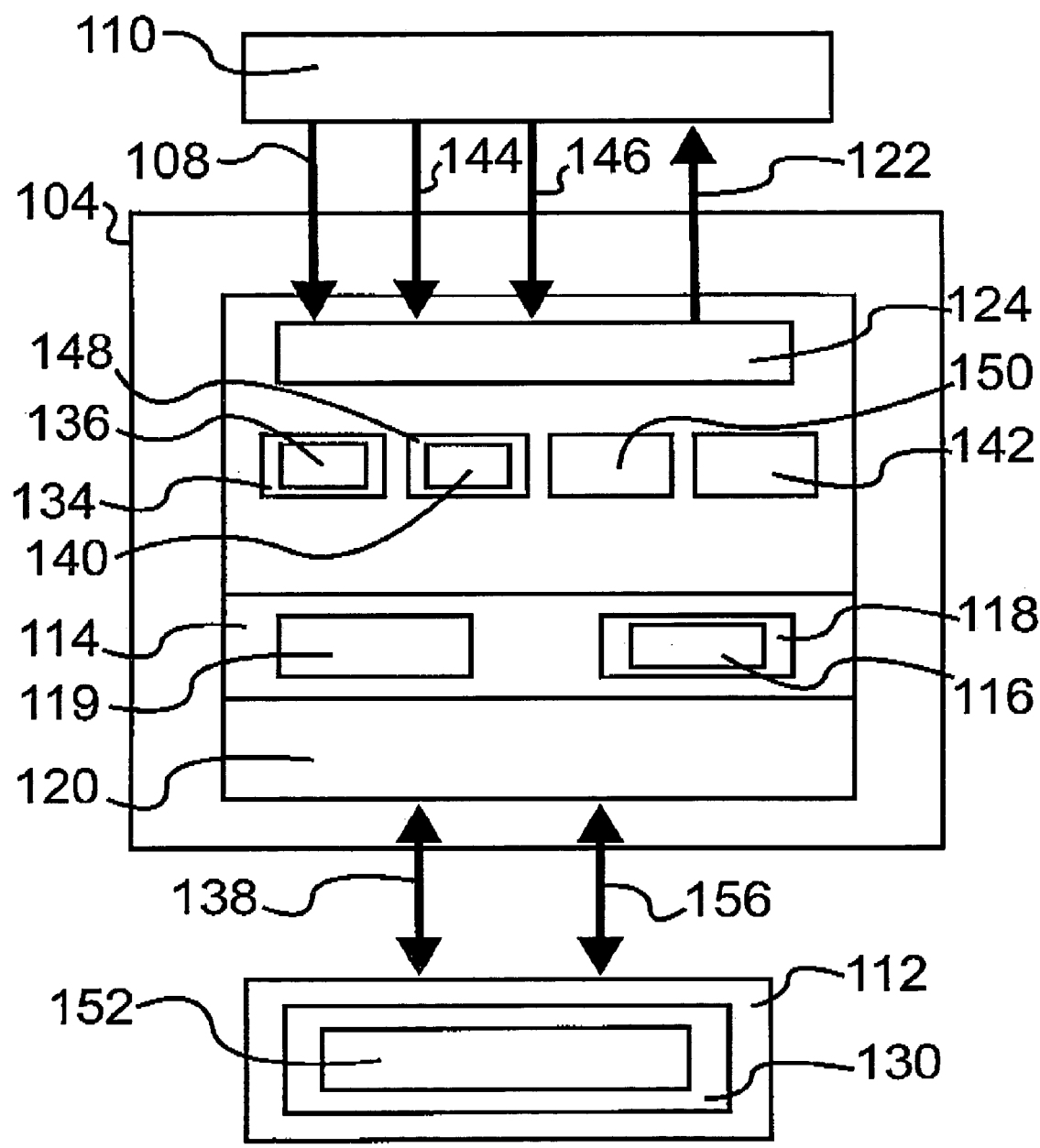
FIG. 7 is a diagram of the diagnostics associated with the configuration server software.

FIG. 7 shows details of diagnostics and other tools that can be used on the enterprise server. In the FIG. 7, the configurable server software 104 can optionally utilize interface diagnostics 134 for one or more of the configurable interfaces. The interface diagnostics 134 can identify the frequency of software errors, communication errors, and types of errors occurring with one or more configurable interfaces as the interface communicates with specific device 112 and other errors or combinations of errors.

As another option, the configurable server software 104 can include a barometer 136 for a specific device 112 for totalizing errors in communication to the specific device 112.

The barometer 136 can detect and track errors such as framing errors, CRC errors, communication time outs and combinations of these errors.

The previously identified configurable connection interface 120 is connected by a channel 138, and a second barometer 140 can be used with a channel 138 for totalizing the errors occurring within that channel 138.

Interface control commands 142 can be installed on the configurable server software 104 to allow client initiated modifications 144 from client application 110 to configurable server software 104 during enterprise server operation.

Control commands 146 communicate with configurable server software 104 to initiate activities or terminate activities or schedule future activities during enterprise server operation.

The barometer 136 and the second barometer 140 totalize errors that occur in the system by weighting by a factor of two, each error identified, and by weighing by a factor of one, each successful response.

Server diagnostics 148 can optionally be used to determine the frequency of communication errors and the type of errors, which occur with the configurable server software 104 as it communicates with one or more specific devices 112.

Database diagnostics 150 can optionally be used with the configurable server software 104 for use with the configurable database interface 126 to identify errors in between the specific device 112 and database 128.

In the best mode, it is contemplated that the database usable with the enterprise server is a relational database.

The configurable server software 104 is adapted to switch between a channel 138 and a second channel 156 upon indication of a communication failure occurring during use of channel 138. Switching between channels 138 and 156 can be scheduled to automatically occur after a certain number of attempts to establish a connection with a specific device using a particular channel, such as channel 138 fails. It should be noted that it is within the scope of this invention that channel 138 can be a communication with the global communication network and channel 156 can be a public switched telephone network. Alternatively, both channels 138 and 156 can communication with the Internet, such as by T-1 line or DLS connection, or both channels can be public switched telephone networks, PSTN, fiber optic communications lines, leased lines, radio communication channels or satellite links.

Returning to FIG. 6, it should be noted that an optional configurable logging interface 158 can be used on the configurable server software 104 for communicating with a software logging program 160 for tracking and viewing errors occurring in a channel, such as 138 or with a specific device, such as 112 and then storing the tracked errors in memory 102 (which is shown in FIG. 5).

It should be noted that specific device datasets 130 comprise compiled operational data points 152 for the specific device 112, as shown in FIG. 6.

Figure 8:
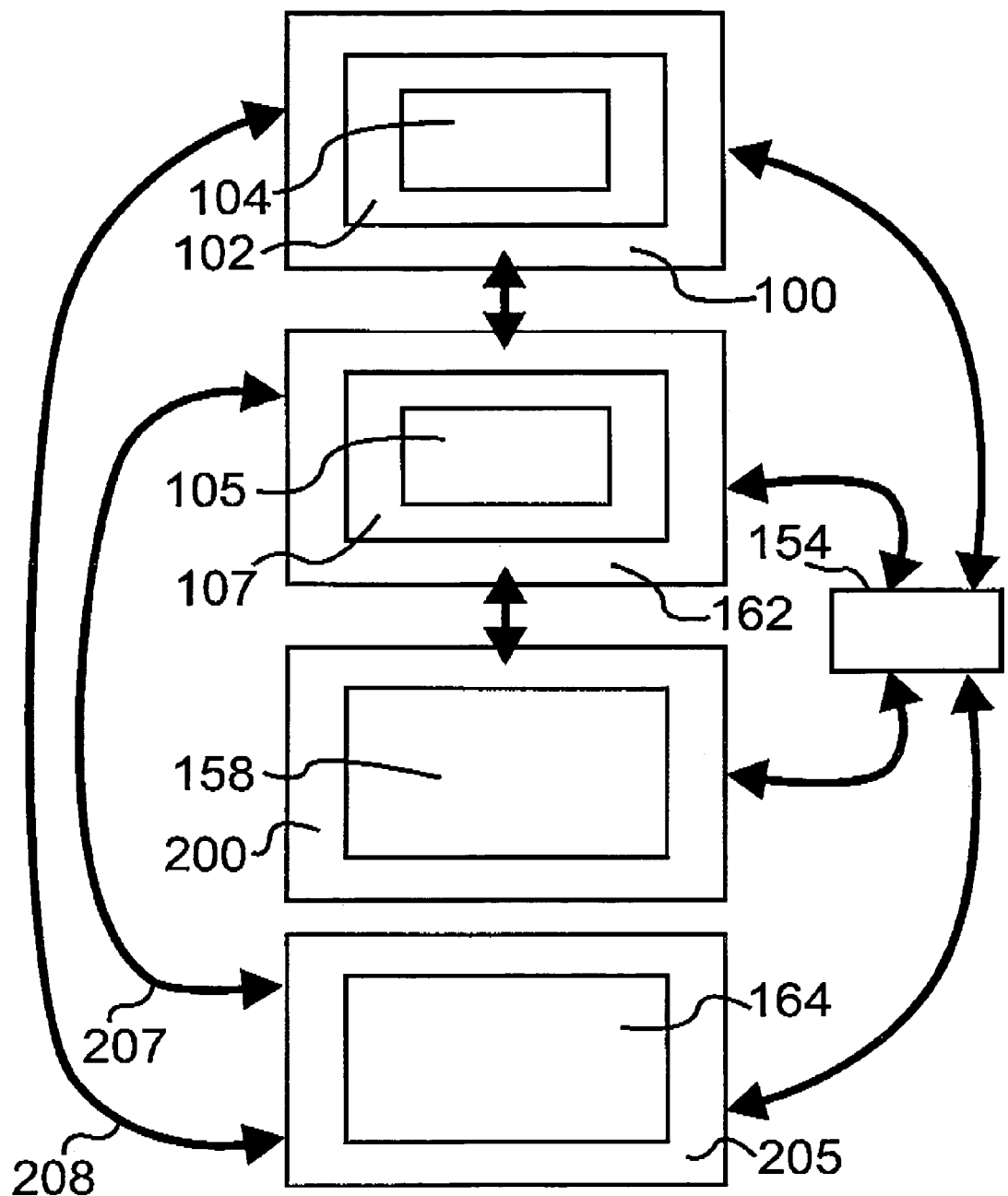
FIG. 8 is a diagram of an embodiment of the invention whereby the server and the interfaces link via the global communication network.

Another version of the invention contemplates the configurable server software 104 having a configurable AES interface 164 disposed on the configurable server software 104 for communicating with an AES service program 166. Alternatively, the configurable AES interface 164 could communicate with a global communication network 154 using another computer 205 hosting an AES service program 166 as shown in FIG. 8. If computer 205 is used, it is preferred that this computer have NT-type functionality. The computer 205 can communicate via a link 207 directly with the enterprise server 168, or via a link 208 directly with enterprise server 99, or both. In addition, a database can store the configuration of the AES interface.

It is also contemplated that a plurality of device protocols 118 and 119 can be supported simultaneously by the configurable protocol interface 114 as shown in FIG. 7.

Moving onto FIG. 8, it is contemplated that the enterprise server of this invention can communicate via a global communication network 154. In addition, it is also contemplated that two enterprise servers, a first enterprise server 99 consisting of a configurable server software 104, a computer 100 and memory 102 can communicate with a second enterprise server 168 consisting of a second configurable server software 105, a second computer 162 and second memory 107 via a link 202. It is also contemplated that the configurable logging interface 158 can reside an yet another computer 200 and communicate with the global communication network 154, or with second enterprise server 168 hosting the software logging program via a link 204.

In yet another embodiment, the software logging program can reside on the enterprise server 99.

The invention also relates to two methods a first method for communicating between configurable server software and a specific device comprising the steps of: (a) receiving a client request from a client application for the status on a specific device via a server interface; (b) converting the client request into a message using a protocol interface; (c) transmitting the message to the specific device using a connection interface; (d) receiving a response from the specific device using the connection interface; (e) interpreting the response using the protocol interface, forming an interpreted response; (i) storing the interpreted response as cached data in the configurable server software; and (g) transmitting the interpreted response to the client application.

Additionally, the invention relates to a method for obtaining a dataset from a specific device using configurable server software comprising the steps of: (a) receiving a client request from a client application for a dataset on a specific device via a server interface; (b) converting the client request into a message using a protocol interface; (c) transmitting the message to the specific device using a connection interface; (d) receiving data from the specific device using the connection interface; (e) interpreting the data using the protocol interface, forming a dataset; (f) storing the data to a database; and (g) transmitting the completion of the storing of the data to the client application.

It will be appreciated by those of ordinary skill in the art that the description given herein with respect to those Figures is for exemplary purposes only and is not intended in any way to limit the scope of the invention. For example, an RTU is described herein with reference to a remote terminal unit, such as a microprocessor-based meter is merely for the purpose of clearly describing the present invention and in not intended as a limitation. The RTU could be, for example, a microprocessor-based meter. The methods described herein could be provided as a software package that operates directly on the RTU or on the SCADA device.

The above description of preferred embodiments is not intended to limit the scope of protection of the following claims. Thus, for example, except where they are expressly so limited, the following claims are not limited to a method wherein the simulation data is transferred to the RTU. The simulation data could be stored locally in memory, on magnetic disk, magnetic tape or the like. Moreover, the claims are not limited to a method of entering simulation mode by removing the register update module from the task list. Other methods could be equally effective. For example, the register update module could itself recognize the RTU mode and withhold from storing data in the registers.

What is claimed is:

1. An enterprise server for communication for a supervisory control and data acquisition (SCADA) system, comprising:
    (a) configurable server software running on memory in a computer;
    (b) a configurable server interface adapted to receive at least one client request from at least one client application requesting status data on a specific device and the interface provides those requests to the client application;
    (c) a configurable protocol interface in communication with the server software for building a message for the specific device using a device protocol;
    (d) a configurable connection interface for connecting to said specific device and enabling the message to be transmitted to the specific device and receiving the specific device status data from the specific device and transmitting the status data to the configurable server interface using the device protocol; and
    (e) caching the status data on said memory in said computer as cached data from the configurable server interface.

2. The enterprise server of claim 1, wherein said server software comprises an ability to request status data on a specific device at defined time intervals.

3. The enterprise server of claim 1, wherein said server software further comprises the ability to transmit the cached data to a client application.

4. The enterprise server of claim 1, wherein said cached data comprises a member of the group current operational information on a specific device, historical operational information received from a specific device, and combinations thereof.

5. The enterprise server of claim 4, wherein said operational information is a member of the group comprising: pressure data, temperature data, flow data, maintenance repair data, battery limit data, leak detection data, equipment run times, plant conditions and combinations thereof.

6. The enterprise server of claim 1, further comprising a configurable database interface communicating with a database for storing and compiling specific device datasets.

7. The enterprise server of claim 6, further comprising database diagnostics for use with the database to identify errors in communication between the database and the specific device.

8. The enterprise server of claim 6, wherein said database is a relational database.

9. The enterprise server of claim 6, wherein said specific device datasets comprise compiled operational datapoints.

10. The enterprise server of claim 1, further comprising a configurable database interface comprising a communication protocol for communicating with a specific device, for collecting specific device datasets and writing the specific device datasets to the database.

11. The enterprise server of claim 1, further comprising interface diagnostics for one or more of the configurable interfaces to identify a member of the group comprising: the frequency of software errors, communication errors, types of errors occurring with one or more configurable interfaces as the interface communicates with a specific device, other errors and combinations thereof.

12. The enterprise server of claim 11, further comprising a barometer for a specific device for totalizing errors in communication to the specific device.

13. The enterprise server of claim 12, wherein said barometer is at least two barometers for totalizing errors by weighting by a factor of two, each error identified and by weighting by a factor of one, each successful response.

14. The enterprise server of claim 11, wherein said errors comprise a member of the group: framing errors, CRC errors, communication time outs and combinations thereof.

15. The enterprise server of claim 11, wherein said specific device and the configurable connection interface are connected by a channel, and said enterprise server further comprising a second barometer that can be used with the channel for totalizing the errors occurring within that channel.

16. The enterprise server of claim 15, wherein the configurable software server is adapted to switch between a channel and a second channel upon indication of failure by the channel in use by the enterprise server.

17. The enterprise server of claim 16, wherein said switching of channels automatically occurs if a certain number of attempts to establish a channel fails.

18. The enterprise server of claim 11, further comprising a configurable logging interface running on the configurable server software and communicating with a software logging program for tracking and viewing errors occurring in a channel or with a specific device and then storing the tracked errors.

19. The enterprise server of claim 18, wherein said configurable logging interface communicates over a global communication network with a second computer hosting the software logging program.

20. The enterprise server of claim 18, wherein said software logging program resides on said enterprise server.

21. The enterprise server of claim 1 further comprising interface control commands installed on the enterprise server to allow client initiated modifications to interface configurations during enterprise server operation.

22. The enterprise server of claim 1, further comprising server control commands to allow client initiated modifications to server software during enterprise server operation.

23. The enterprise server of claim 1, further comprising server diagnostics for use with the configurable server software to determine the frequency of communication errors and the type of errors, which occur with the configurable server software as it communicates with a specific device.

24. The enterprise server of claim 1, wherein said computer is adapted to run on a windows-based operating system.

25. The enterprise server of claim 1, wherein said computer is adapted to run on a NT-based operating system.

26. The enterprise server of claim 1, wherein said configurable connection interface communicates via a global communication network.

27. The enterprise server of claim 1, further having a configurable AES interface disposed on said enterprise server adapted for communicating with an AES service program, which runs on the enterprise server.

28. The enterprise server of claim 27, wherein said configurable AES interface can communicate over a global communication network with a second computer hosting the AES service program running on an NT-type operating system.

29. The enterprise server of claim 27, wherein a relational database stores the configuration of the AES interfaces.

30. The enterprise server of claim 27, wherein client initiated modifications of server software and interface configurations occur during operation of the enterprise server.

31. The enterprise server of claim 1, further having a configurable enterprise interface for communicating with a second enterprise server.

32. The enterprise server of claim 1, wherein a plurality of device protocols are supported simultaneously by said configurable protocol interface.

33. A method for communicating between configurable server software and a specific device comprising the steps of:
(a) receiving a client request from a client application for the status on a specific device via a server interface;
(b) converting the client request into a message using a protocol interface;
(c) transmitting the message to the specific device using a connection interface;
(d) receiving a response from the specific device using the connection interface;
(e) interpreting the response using the protocol interface, forming an interpreted response;
(f) storing the interpreted response as cached data in the configurable server software; and
(g) transmitting the interpreted response to the client application.

34. A method for obtaining a dataset from a specific device using configurable server software comprising the steps of:
(a) receiving a client request from a client application for a dataset on a specific device via a server interface;
(b) converting the client request into a message using a protocol interface;
(c) transmitting the message to the specific device using a connection interface;
(d) receiving data from the specific device using the connection interface;
(e) interpreting the data using the protocol interface, forming a dataset;
(f) storing the data to a database; and
(g) transmitting the completion of the storing of the data to the client application.

* * * * *